Patented Apr. 15, 1930

1,754,842

UNITED STATES PATENT OFFICE

ISIDOR TRAUBE, OF BERLIN-CHARLOTTENBURG, GERMANY, ASSIGNOR TO THE NAUGATUCK CHEMICAL COMPANY, OF NAUGATUCK, CONNECTICUT, A CORPORATION OF CONNECTICUT

CONCENTRATING RUBBER LATEX

No Drawing. Application filed September 3, 1924, Serial No. 735,602, and in Germany October 23, 1923.

The invention refers to a method of concentrating rubber balata or such like latex or separating rubber from latex. The process of the invention consists in bringing latex into contact with organic colloids causing a separation or concentration of the rubber hydrocarbons.

Suitable organic colloids for my purpose are vegetable mucilages, particularly those of Caragheen moss, Iceland moss and the like. The process may be carried out by adding an aqueous extract of the so-called mosses to the latex. Even a very small proportion of the said extracts will determine in a short time the separation into two layers of a quantity of latex to which it has been added. One layer, generally the lower layer, contains little rubber, while the other contains the rubber in concentrated form and by suitable choice of the proportion of extract added, may be obtained of the consistence of a thick cream. One may use also the mosses themselves or the mucilage substances in solid form.

Coagulation of the latex particles does not generally occur. The separation into layers may be hastened or completed by raising the temperature.

Other colloid substances may be substituted for the extract of vegetable mucilage. Thus gelatinized mucilage, glue, gelatin jelly and the like may be used, even in solid form.

The process may be carried out in bringing the latex cream made as above described on to the surface of a sufficiently concentrated jelly of gelatin or other colloid for instance of the vegetable mucilages. In this way after a time a coherent layer of rubber substances will be formed on the surface of the gelatin or the jelly. The coherent layer is adapted to be handled, dried and vulcanized.

It is advantageous to mix the gelatin jelly with glycerin, molasses or other agent adapted to withdraw water from the latex, before the application of the cream.

The gelatin from which the layer of rubber has been removed may be freed from excess of water by evaporation or otherwise and used again.

Another modification of the present process consists in mixing the latex cream, as concentrated according to the present process, with filling substances as for instance chalk and vulcanizing agents, as sulphur or sulphur compounds and molding the masses to desired shapes. By pressing, heating or kneading or adding water combining substances as lime one may separate the water before molding. The drying operation may be also effected by applying the mass to a surface of gelatin or glycerine-gelatine as described above.

The following examples illustrate the invention:

1. To 100 litres of fresh latex is added the extract made by heating 140 grams of Caragheen moss with 14 litres of water and straining the solution. After stirring the latex is left at rest for some hours or longer at 50–60° C., during which time there are formed two layers, the upper one containing practically all the rubber substance which bears to the water in the layer about twice the proportion that it had in the original latex.

2. A jelly made by heating 100–200 grams of gelatin with 1 litre of water is allowed to cool and upon it is poured 1 litre of latex cream, as prepared according to the present invention, for instance according to Example 1. Preferably one uses freshly prepared latex cream. After some time, for instance after one or more hours a cake of rubber can be lifted from the gelatin.

3. One litre of latex cream, prepared according to the present invention for instance according to Example 1 and of 50–60 per cent strength is mixed with 300 grams of calcium carbonate and about 100 grams of sulphur. This mixture is dried for instance by leading warm gases through it or by application to gelatin as described in Example 2 and the plate thus formed is vulcanized in the known manner.

I claim:—

1. The process of separating rubber from latex which consists in bringing the latex into contact with organic colloids and allowing the latex to separate into two layers.

2. The process of separating rubber from latex which consists in bringing the latex into contact with vegetable mucilages and allowing the latex to separate into two layers.

3. The process of separating rubber from latex which consists in bringing the latex into contact with organic colloids, allowing the latex to separate into two layers, applying the concentrated rubber latex to a surface of an organic colloid jelly and allowing the rubber substance to become a coherent layer.

4. The process of separating rubber from latex which consists in bringing the latex into contact with organic colloids, allowing the latex to separate into two layers, applying the concentrated rubber latex to a surface of an organic colloid jelly containing organic dehydrating agents, and allowing the rubber substance to become a coherent layer.

5. The process of separating rubber from latex which consists in bringing the latex into contact with organic colloids, allowing the latex to separate into two layers, mixing the concentrated rubber latex with filling materials and vulcanizing agents, removing the water and molding the masses.

6. The method of concentrating rubber latex which consists in adding to the latex a colloidal substance, warming the mixture, permitting said mixture to stand at the raised temperature until separation into two layers of different rubber concentration, removing therefrom one of the layers.

7. A process for treating latex which consists in segregating the rubber containing portion thereof in an uncoagulated layer above the aqueous portion of said latex by addition of chemical compounds, removing said aqueous portion, and recovering an uncoagulated rubber dispersion containing a subnormal percentage of non-rubber constituents.

8. A concentrated uncoagulated latex containing a sub-normal percentage of soluble non-rubber constituents and in addition a small amount of a hydrophilic organic colloid capable of creaming latex and derived from a concentration of the latex by said colloid.

9. A concentrated uncoagulated latex containing a subnormal percentage of soluble non-rubber constituents made by adding to latex a vegetable mucilage, allowing the latex to separate into two layers, and recovering the supernatant layer.

10. A concentrated uncoagulated latex containing a sub-normal percentage of soluble non-rubber constituents and in addition a small amount of vegetable mucilage.

In testimony whereof I hereunto affix my signature.

ISIDOR TRAUBE.